US010846056B2

(12) United States Patent
Kennedy et al.

(10) Patent No.: US 10,846,056 B2
(45) Date of Patent: Nov. 24, 2020

(54) CONFIGURABLE SIMD MULTIPLICATION CIRCUIT

(71) Applicant: Arm Limited, Cambridge (GB)

(72) Inventors: Michael Alexander Kennedy, Cambridge (GB); Neil Burgess, Cardiff (GB); Zichao Xie, Cambourne (GB); Karel Hubertus Gerardus Walters, Cambridge (GB)

(73) Assignee: Arm Limited, Cambridge (GB)

( * ) Notice: Subject to any disclaimer, the term of this patent is extended or adjusted under 35 U.S.C. 154(b) by 171 days.

(21) Appl. No.: 16/105,066

(22) Filed: Aug. 20, 2018

(65) Prior Publication Data

US 2020/0057609 A1    Feb. 20, 2020

(51) Int. Cl.
*G06F 7/523* (2006.01)
*G06F 9/38* (2018.01)
*G06F 15/80* (2006.01)

(52) U.S. Cl.
CPC .............. *G06F 7/523* (2013.01); *G06F 9/382* (2013.01); *G06F 9/3802* (2013.01); *G06F 15/8007* (2013.01)

(58) Field of Classification Search
None
See application file for complete search history.

(56) References Cited

U.S. PATENT DOCUMENTS

| | | | | |
|---|---|---|---|---|
| 5,625,836 A * | 4/1997 | Barker | ................... | G06F 7/483 709/214 |
| 5,717,944 A * | 2/1998 | Wilkinson | ............ | G06F 9/3834 712/20 |
| 7,216,217 B2 * | 5/2007 | Hansen | ............... | G06F 9/30014 708/523 |
| 2004/0267857 A1 * | 12/2004 | Abel | ...................... | G06F 7/5338 708/524 |

OTHER PUBLICATIONS

Wikipedia—"Booth's multiplication algorithm", retrieved Apr. 3, 2018, 4 pages.

* cited by examiner

*Primary Examiner* — Michael D. Yaary
(74) *Attorney, Agent, or Firm* — Nixon & Vanderhye P.C.

(57) ABSTRACT

A configurable SIMD multiplication circuit is provided to perform multiplication on a multiplicand operand M and multiplier operand R with varying data element sizes supported. For each result element generated based on corresponding elements of the multiplicand operand M and the multiplier operand R, the multiplication is performed according to radix-N modified Booth multiplication, where $N=2^P$ and $P \geq 3$. A Booth digit selection scheme is described for improving the efficiency with which higher radix modified Booth multiplication can be implemented in a configurable SIMD multiplier.

17 Claims, 8 Drawing Sheets

*Boundary encoding: partial product generation on boundaries may not see all bits.*

*Right shifting the bit selection resolves the irregularity*

CONFIGURABLE SIMD MULTIPLICATION CIRCUIT

BACKGROUND

Technical Field

The present technique relates to a multiplication circuit.

Technical Background

A processor may have logic circuitry for implementing various arithmetic or logical operations. One arithmetic operation to be supported by a processor may be a multiplication operation. Multiplications are common in a range of processing algorithms, e.g. digital signal processing, and so the performance achieved by the multiplication circuit of a typical CPU may be an important factor in the overall performance of the processor. It may be desirable to support multiplications performed on data values of a range of different sizes.

SUMMARY

At least some examples provide an apparatus comprising:
a configurable SIMD multiplication circuit to perform multiplication on a multiplicand operand M and a multiplier operand R to generate a result value; and
control circuitry responsive to a multiplication command specifying a selected element size from a plurality of element sizes supported by the configurable SIMD multiplication circuit, to control the configurable SIMD multiplication circuit to generate the result value in which each of one or more result elements within the result value has a value corresponding to the product of a corresponding multiplicand element of the multiplicand operand M and a corresponding multiplier element of the multiplier operand R, said corresponding multiplicand element having the selected element size; in which:
for each of said plurality of element sizes supported by the configurable SIMD multiplication circuit, the configurable SIMD multiplication circuit is configured to generate each result element of the result value using radix-N modified Booth multiplication of the corresponding multiplicand element and the corresponding multiplier element, where $N=2^P$ and $P \geq 3$.

At least some examples provide an apparatus comprising:
means for performing a configurable SIMD multiplication on a multiplicand operand M and a multiplier operand R to generate a result value; and
means for controlling, in response to a multiplication command specifying a selected element size from a plurality of element sizes supported by the configurable SIMD multiplication circuit, the means for performing the configurable SIMD multiplication to generate the result value in which each of one or more result elements within the result value has a value corresponding to the product of a corresponding multiplicand element of the multiplicand operand M and a corresponding multiplier element of the multiplier operand R, said corresponding multiplicand element having the selected element size; in which:
for each of said plurality of element sizes, the means for performing the configurable SIMD multiplication is configured to generate each result element of the result value using radix-N modified Booth multiplication of the corresponding multiplicand element and the corresponding multiplier element, where $N=2^P$ and $P \geq 3$.

At least some examples provide a data processing method comprising:
receiving a multiplication command specifying a selected element size from a plurality of element sizes supported by a configurable SIMD multiplication circuit;
in response to the multiplication command, controlling the configurable SIMD multiplication circuit to perform multiplication on a multiplicand operand M and a multiplier operand R to generate a result value in which each of one or more result elements within the result value has a value corresponding to the product of a corresponding multiplicand element of the multiplicand operand M and a corresponding multiplier element of the multiplier operand R, said corresponding multiplicand element having the selected element size; in which:
for each of said plurality of element sizes, the configurable SIMD multiplication circuit generates each result element of the result value using radix-N modified Booth multiplication of the corresponding multiplicand element and the corresponding multiplier element, where $N=2^P$ and $P \geq 3$.

Further aspects, features and advantages of the present technique will be apparent from the following description of examples, which is to be read in conjunction with the accompanying drawings.

DESCRIPTION OF EXAMPLES

Figure 1:
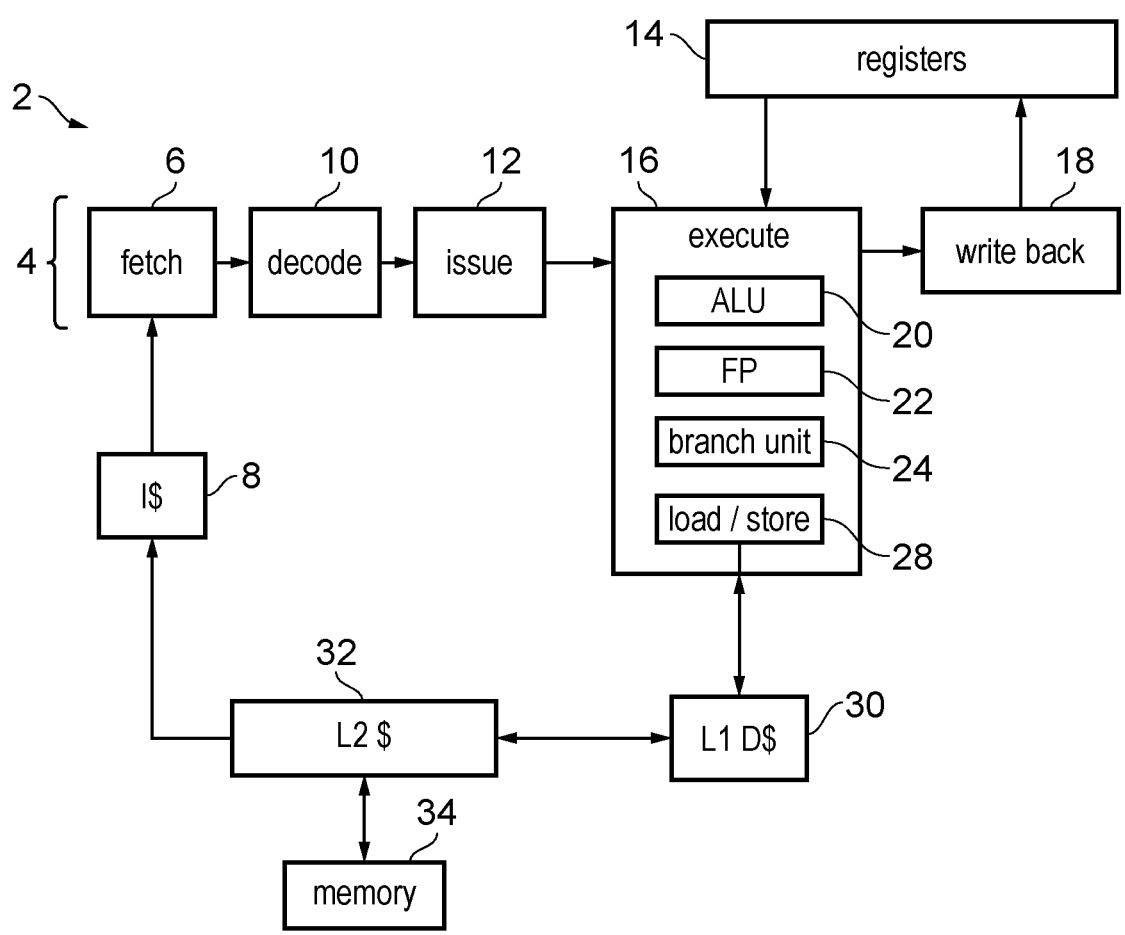
FIG. 1 schematically illustrates an example of a data processing apparatus.

A configurable SIMD multiplication circuit is provided to perform multiplication on a multiplicand operand M and a multiplier operand R to generate a result value. Control circuitry is provided which, in response to a multiplication command specifying a selected element size from among a plurality of element sizes supported by the configurable SIMD multiplication circuit, controls the configurable SIMD multiplication circuit to generate the result value in which each of one or more result elements within the result value has a value corresponding to the product of a corresponding multiplicand element of the multiplicand operand M and a corresponding multiplier element of the multiplier operand R, where the corresponding multiplicand element has the selected element size. By using a configurable SIMD (single instruction, multiple data) multiplier, multiplications across a range of data element sizes can be supported by a single circuit. When smaller element sizes are needed, multiple independent multiplications can be performed on respective elements of the operands in response to the same instruction. By using a SIMD approach, this can reduce the total number of instructions needed to carry out a certain number of multiplications. In the technique discussed below, for each of the element sizes supported by the configurable SIMD multiplication circuit, each result element of the result value is generated using radix-N modified Booth multiplication of the corresponding multiplicand element and the corresponding multiplier element, where $N=2^P$ and $P \geq 3$. Most conventional approaches to Booth multiplication may use a lower radix Booth multiplication, such as radix-4 Booth multiplication. By using a higher radix form of Booth multiplication, e.g. radix-8 or higher, the number of partial products needed to be added to form the result can be reduced, so as to improve the performance of the multiplier. One might expect that higher-radix-modified Booth multiplication would be unsuitable for a configurable SIMD multiplication circuit which supports multiplication across a range of different data element sizes, because conventional approaches to digit selection involved in such higher radix Booth multiplication would not fit well with the positions of element boundaries in a SIMD scenario, so that it might be expected that extremely complex logic would be required to support the different element size of options in the context of the higher radix Booth operation. However, the inventors recognised that this complexity can be mitigated by an adjustment to the Booth digit selection process so that it becomes feasible to implement higher radix Booth multiplication in a configurable SIMD multiplication circuit in an efficient manner. Hence, by providing a configurable SIMD multiplication circuit which uses radix-8 modified Booth multiplication or higher, multiplication can be performed with higher performance across a range of different data element sizes in a SIMD environment.

The configurable SIMD multiplication circuit may support a range of element sizes where the minimum element size supported is $E_{min}$ bits. $E_{min}$ could be 8 or 16 bits for example. The value of P may be such that $E_{min}$ modulo P is non-zero. For example, if $E_{min}$ is a power of 2 number of bits as in typical SIMD multiplication circuits, then values of P which satisfy $E_{min}$ modulo P being non-zero may include 3, 5, 6, 7, etc. The approach discussed below can be particularly useful for cases when $E_{min}$ modulo P is non-zero since this may result in a varying phase relationship between the positions of Booth digits selected in the Booth multiplication process and the element boundaries for the SIMD multiplier if conventional digit selection schemes are used. The technique discussed below is able to handle cases when $E_{min}$ modulo P is non-zero without complex logic for handling digit selection at element boundaries.

In response to a multiplication command for which the selected element size is greater than $E_{min}$ bits, the configurable SIMD multiplication circuit may perform the radix-N modified Booth multiplication with a Booth encoding applied separately to each $E_{min}$-bit portion of the multiplicand operand M. Hence, even though the multiplicand elements within the multiplicand operand M have a size greater than $E_{min}$ bits, the Booth encoding is still applied separately to each $E_{min}$ bit portion of the multiplicand operand. This approach works because a multiplication M×R can be performed with one of the values being multiplied being partitioned into separate sections which are multiplied separately with the other value and then added (e.g. in decimal notation, a multiplication 154236×902 may be equivalent to adding 154000×902+236×902, without changing the result). Hence, by effectively partitioning the larger elements of the multiplicand operand into $E_{min}$-bit portions and separately Booth encoding each $E_{min}$-bit portion, while this could result in some additional partial products, this may simplify the circuit implementation because the positions of Booth digits generated in the Booth encoding of a given $E_{min}$-bit portion of the multiplicand operand M can be the same regardless of which particular element size is currently selected as the selected element size. This reduces the circuit area required for the processor circuit logic. This approach may be counter intuitive since partitioning larger values in this way may for some operations result in a greater number of partial products being required to be added, which could be seen by a skilled person to reduce performance or increase circuit area in the adder used to add the partial products. However, the inventors recognised that the benefit of reduced circuit area and logic complexity in generating the Booth encoded partial products may outweigh the relatively small increase in area in the adder caused by the increased number of partial products required for some element sizes. Hence, this allows a more efficient implementation of the configurable SIMD multiplication circuit which uses higher radix modified Booth multiplication.

The configurable SIMD multiplication circuit may include a number of components. The multiplication circuit may include Booth digit selection circuitry to select a given number A of Booth digits $BD_0$ to $BD_{A-1}$. Each Booth digit is selected based on a respective bit portion of the multiplicand operand M. The SIMD multiplication circuit also includes partial product generating circuitry which generates a number of partial products for each result element of the result value. Each partial product comprises a multiple of the corresponding multiplier element, with that particular multiple being selected based on a respective one of the Booth digits for which the bit portion used to select the Booth digit is within the corresponding multiplicand element. An adder is provided to generate each result element of the result value by adding the plurality of partial products generated for that result element by the partial product generation circuitry. The Booth digit selection performed by the Booth digit selection circuitry may be based on a Booth encoding which is applied separately to each $E_{min}$-bit portion of the multiplicand operand M regardless of the selected element size, as discussed above.

The bit portions of the multiplicand operand M used by the Booth digit selection circuitry to select the Booth digits may be at the same bit positions within the multiplicand operand M regardless of which of the element sizes has been selected as the selected element size to be used for the current multiplication operation being performed. Hence, there is no need to vary, based on the selected element size, the positions of the bits from which each Booth digits are selected. This makes logic implementation much simpler.

The partial product generation circuitry may include a multiple selector which selects, for each partial product, the multiple of the corresponding multiplier element which is to be used for generating the partial product, based on a respective one of the Booth digits. A mapping between bit values of a given one of the Booth digits and which multiple of the corresponding multiplier element is selected by the partial product generation circuitry based on the given Booth digit may be independent of which of the element sizes is used as the selected element size for the current operation being performed. That is, since the bit positions at which the Booth digits are selected from the multiplicand operand are selected so that the positions are the same for each $E_{min}$ bit portion regardless which data element size is the selected element size, this means that the multiple selector does not need to consider different versions of each multiple depending on the phase relationship between the selected Booth digits and the positions of element boundaries. This means that multiplexers of a smaller size can be used since the number of different options available for selecting as the multiple of the multiplier element to be used for generating the partial product can be fewer. This may be particularly useful for higher radix Booth multiplication schemes since in radix-8 Booth multiplication, for example, the number of different options for the multiple increases (−4 to +4) compared to the options for radix-4 Booth multiplication (−2 to +2). Hence, by implementing the Booth digit selection so that it is not necessary to select from more than one option for each one of the (−4 to +4) multiples, this avoids a significant increase in the complexity of the multiplexer circuit logic and reduces processing delay through the multiplexer. A mapping between bit values of the respective one of the Booth digits and which particular multiple of the multiplier element is selected by the partial product generation circuitry may be independent of a relative position between the bit portion of the multiplicand operand used to select the Booth digits and an element boundary between respective elements of the selected element size within the multiplicand operand M.

The Booth digit selection circuitry may select the Booth digits $BD_0$ to $BD_{A-1}$ such that: Booth digit $BD_0$ is selected based on a least significant bit portion of the multiplicand operand M; Booth digit $BD_{A-1}$ is selected based on a most significant bit portion of the multiplicand operand M; Booth digit $BD_i$, where $1 \leq i \leq A-1$, is selected based on a bit portion of the multiplicand operand M having a most significant bit SH bit positions more significant than a most significant bit of the bit portion used to select Booth digit $BD_{i-1}$; and SH has a different value for at least two values of i less than A−1. In comparative Booth digit selection schemes, the offset SH between the bit positions at which neighbouring Booth digits are selected from the multiplicand operand M may be constant for all Booth digits other than the most significant Booth digit $BD_{A-1}$. This can provide the minimum number of partial products required to calculate the product of M*R when the selected element size is the maximum data element size. However, in the technique discussed below, SH may have a different value for at least two values of i less than A−1, there are some Booth digits which are offset by a smaller amount compared to other Booth digits, for at least one position within the multiplicand operand M which is not at the most significant end of the operand. By using a variable offset between the positions at which the Booth digits are selected from the multiplicand operand M, this can allow the Booth digit selection pattern to be the same for each $E_{min}$-bit portion of the multiplicand operand so that the Booth digit selection does not need to vary depending on the selected element size.

The Booth digit selection circuitry may select the Booth digits with SH being less than P for at least one value of i less than A−1. Hence, whereas conventional digit selection schemes would have SH equal to P for each Booth digit $BD_1$ to $BD_{A-2}$ (other than the most significant Booth digit $BD_{A-1}$), with the approach discussed below the offset between adjacent Booth digits is less than P for at least one of the intermediate Booth digits $BD_1$ to $BD_{A-2}$. Again this helps reduce the complexity of handling the different element sizes of the configurable SIMD multiplier.

In one approach the Booth digit selection circuitry may select the Booth digits so that SH has one of two values: P and ($E_{min}$ modulo P), for each value of i less than A−1. This approach can help to reduce the number of partial products required compared to the case if other values were used for SH, hence improving performance.

In one example, the multiplicand operand M comprises T bits, where $T=q*E_{min}$ and $E_{min}$ is a minimum element size supported by the configurable SIMD multiplication circuit; and the Booth digit selection circuitry is configured to select Booth digit $BD_k$, where $(A/q) \leq k \leq A-1$, based on a bit portion of the multiplicand operand M having a most significant bit $E_{min}$ bit positions more significant than a most significant bit of the bit portion used to select Booth digit $BD_{k-A/q}$. Hence, the offset between the positions at which Booth digits $BD_k$ and Booth digits $BD_{k-A/q}$ are selected may be $E_{min}$ bit positions, where $E_{min}$ is the minimum element size supported by the multiplication circuit. This approach means that the pattern of Booth digit selection will be consistent for each $E_{min}$-bit portion of the multiplicand operand, making the circuit logic much simpler.

The multiplicand operand M may comprise T bits, where $T=q \times E_{min}$. The given number A of Booth digits selected may include q partitions of Booth digits where each partition of Booth digits is selected based on bit portions in a corresponding sub-portion of the size $E_{min}$ within the multiplicand operand. Again, by partitioning the multiplicand operand M into smaller $E_{min}$ bit portions even when the selected element size is greater than $E_{min}$, this means that the partitions of the Booth digits may map to the sizes of the element sizes which could be selected for the SIMD multiplier to give a more consistent mapping and hence reduce the complexity of logic. The minimum number of Booth digits which can be generated may be $$A = A \geq q * \left( \left\lfloor \frac{E_{\min}}{P} \right\rfloor + 1 \right).$$

This can be achieved if SH is selected with one of two values (P and $E_{min}$ modulo P) as discussed above. However, some implementations could choose to generate additional Booth digits by introducing additional partitions (similar to the partitions at $E_{min}$-bit boundaries as discussed below) without changing the correctness of the product result, and so in some cases A may be greater than or equal to $$= A \geq q * \left( \left\lfloor \frac{E_{\min}}{P} \right\rfloor + 1 \right).$$

Hence, the Booth digit selection circuitry may generate q partitions of Booth digits, each partition corresponding to an $E_{min}$ bit portion of the multiplicand operand. The Booth digit selection circuitry may make an adjustment to the values of the least significant Booth digit of each partition and a most significant Booth digit of each partition, to account for the element size boundaries. However, this adjustment can be independent of which element size is selected as the selected element size for the current operation, because the positions of the Booth digits have been selected so that the partitions are being used regardless of the data element size so as to reduce the complexity. Hence, for a least significant Booth digit of each partition, the Booth digit selection circuitry may set a least significant bit of the least significant Booth digit to 0, regardless of which of the element sizes is the selected element size. Remaining bits of the least significant Booth digit of the partition may be based on a least significant bit portion of the corresponding sub-portion of size $E_{min}$ within the multiplicand operand M.

On the other hand, for a most significant Booth digit of each partition, the Booth digit selection circuitry may generate the most significant Booth digit based on a sign extension or zero extension of a most significant bit portion of the corresponding sub-portion of the multiplicand operand M, and a bit position of sign-extended or zero-extended bits within the most significant Booth digit is the same regardless of which of the elements is the selected element size. A sign extension is used at partition boundaries which correspond to an element boundary, while a zero extension is used at partition boundaries other than element boundaries. Hence, for the most significant Booth digit of the most significant partition within a given data element, the most significant bit portion of the corresponding sub-portion of multiplicand operand M is sign extended. For signed multiplications, the sign extension comprises extension with one or more bit values of the same value (0 or 1) as the most significant bit. For unsigned multiplications, the sign extension comprises extension with one or more bit values of 0. For the most significant Booth digit of a partition other than the most significant partition within a given data element, the most significant bit portion of the corresponding sub-portion of multiplicand operand M is zero extended (i.e. extended with bit values equal to 0 regardless of the value of the most significant bit).

Hence, these adjustments at the least and most significant ends of the partition account for the fact that the total number of bits of the Booth digits required for a given partition according to the higher radix modified Booth multiplication scheme may require more bits than are required in the $E_{min}$-bit portion of the multiplicand operand, and so a zero is included at the lower end and a sign extension or zero extension at the upper end to account for this. However, by using the Booth digit selection scheme discussed above, the selection of which bit positions are filled with zeroes or sign extension bits can be the same regardless of the current element size, which greatly simplifies the logic.

While the present technique can be used for any higher radix modified Booth multiplication operation, particularly where $E_{min}$ modulo P is non-zero, it can be particularly useful when N=8 (i.e. P=3). As the radix used for Booth multiplication increases, the number of different multiples of the multiplier which have to be generated for selection based on the Booth digits increases, and the complexity of the multiple generation and selection logic may begin to outweigh the benefits of increased performance achieved by reducing the number of partial products which have to be added in higher radix operations. When N=8, the balance between circuit complexity in the partial product generation and performance in adding the partial products may be improved, as this may provide a good tradeoff between the number of multiples required for selection and the number of partial products required to be added. Hence, while the technique discussed below could be used for higher radix operations, such as radix-32 modified Booth multiplication or higher, in practice it may be particularly beneficial for a configurable SIMD multiplication circuitry which uses radix-8 modified Booth multiplication.

As discussed above, the configurable SIMD multiplication circuit may support a range of element sizes, where the selected element size refers to the size of the multiplicand elements of the multiplicand operand M which are multiplied with corresponding multiplier elements of the multiplier operand R. The multiplier elements could have the same size as the corresponding multiplicand elements, so that the multiplier elements also have the selected element size. However, it is also possible to design multiplication circuits which support multiplication of corresponding elements of different sizes, and in this case the multiplier elements could have a larger size or smaller size than the selected element size for the multiplicand element. For example, the SIMD multiplier could in some examples support multiplication of 16-bit multiplicand elements with 8-bit multiplier elements. Nevertheless, most common multiplication operations may have the same size for the elements of the multiplicand operand M and the multiplicand operand R respectively, and so some circuit implementations could be implemented so that the sizes of the elements in both operands are always the same.

Similarly, the relationship between the size of the result element in the result value and the selected element size could vary. The result elements could have the same size as the selected element size used for the multiplicand element, or could have a larger size. In general, a multiplication of two data values will produce a result with a larger number of bits. In some processing operations, the full product result may be required (e.g. multiplication of two X-bit values may generate a 2X-bit result). In some cases, to retain the full multiplication result, but preserve the same element size in the result value compared to the input operands, half the multiplication result in each lane of the SIMD multiplication could be written to one register and the other half of the result could be written to another register. Also, some SIMD multiplications could also support an operation where only half of the data elements of the multiplicand and multiplier operands M and R are considered as valid, and the result of multiplying those valid elements may be spread across two adjacent lanes of the result value (e.g. within a result vector, lane 0 could be set to the lower half of the result of multiplying the elements in lane 0 of the multiplicand and multiplier operands while lane 1 could be set to the upper half of the product of the element in lane 0 of the multiplicand and multiplier operands, with the input elements in lane 1 of the multiplicand and multiplier operands being ignored for this multiplication). Alternatively, other implementations or other instructions could support simply generating a result which only provides the lower half or the upper half of the multiplication result and discards the other half so that the result elements can still fit within a vector where the elements have the same size as in the input operands. Hence, it will be appreciated that there are a number of ways in which multiplication instructions can be implemented in a SIMD multiplier. Some SIMD circuits may support two or more of the different options discussed above. The Booth digit selection scheme can be applied regardless of which of these options is taken.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from a scalar register file 21; a floating point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

One example of an operation which may be supported by the ALU 20 is a multiplication operation. In some systems, a dedicated execution unit called a multiply-accumulate (MAC) unit may be provided to handle multiplications since multiply-accumulate operations (where two operands are multiplied and the result is added to an accumulator value) may be a common operation in digital signal processing algorithms for example. The performance achieved on a multiplication operation can be an important factor in the overall performance achieved from processing some workloads.

Figure 2:
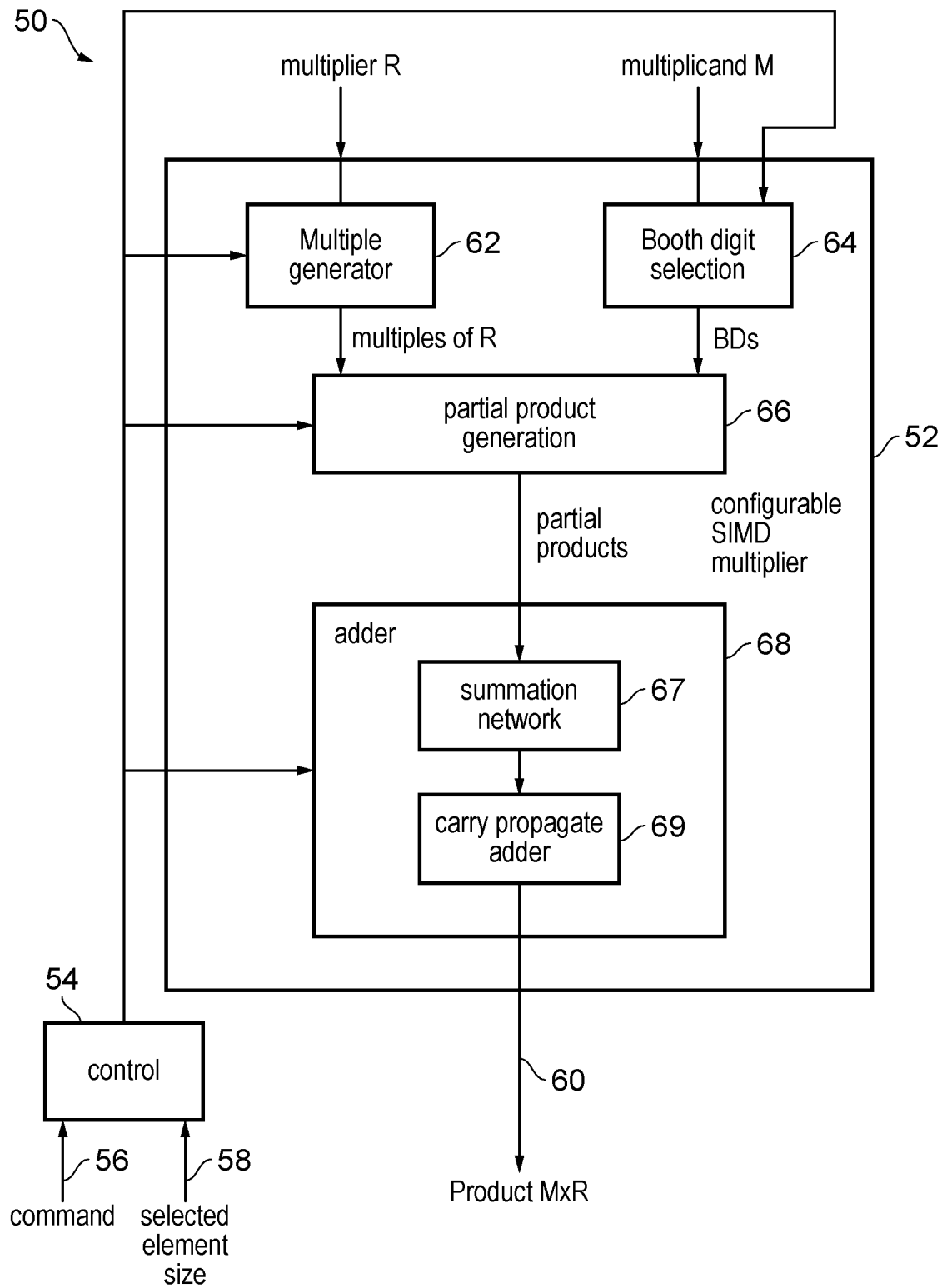
FIG. 2 illustrates an example of a SIMD multiplication circuit.

FIG. 2 illustrates an example of a multiplication circuit 50 which could be included within the execute stage 16 of the processor 2. The multiplication circuit 50 includes a configurable SIMD multiplier 52 and control circuitry 54 for controlling the configurable SIMD multiplier 52 based on parameters of a multiplication instruction which is executed by the processing pipeline 4. In response to the multiplication instruction, a command 56 may be generated (e.g. the command may be a micro-operation or decoded instruction as generated by the decoder 10) which is accompanied by an element size indication 58 which indicates which element size, selected from a range of different element sizes supported by the configurable SIMD multiplier 52, is a selected element size to be used for the current operation. For example the SIMD multiplier 52 could support element sizes of 8 bits, 16 bits, 32 bits, etc. and the element size 58 may distinguish which one to use. For example, a 32-bit register could be divided in different ways as follows:

| M[0] (32 bits) | | | |
|---|---|---|---|
| M[1] (16 bits) | | M[0] (16 bits) | |
| M[3] (8 bits) | M[2] (8 bits) | M[1] (8 bits) | M[0] (8 bits) |

The command 56 may specify registers 14 identifying a multiplicand operand M and a multiplier operand R. The selected element size defines the element size of the elements in the multiplicand operand M. The elements of the multiplier operand R could be the same size as the corresponding elements of the multiplicand operand M, or could be a different size. The ratio between the size of the multiplicand elements in operand M and the multiplier operands in operand R may be fixed (hardwired), or could be variable based on a second element size parameter specified with the commands 56. In the examples below, the size of the multiplier elements is assumed to be the same as the size of the multiplicand elements, but this is not essential.

In response to the command 56 the configurable SIMD multiplier generates a result value 60 which includes a number of results elements where each result element within the result value has a value corresponding to the product of the corresponding multiplicand element of the multiplicand operand M and the corresponding multiplier element of the multiplier operand R. E.g. with 4 8-bit elements in each of the multiplicand M and multiplier R, each multiplication of a corresponding pair of elements of M and R may produce a 16-bit result. Different approaches are available for handling the larger result, for example:

Example 1: only include lower half of result in each result element, and discard upper half.

| Multiplicand | M[3] | M[2] | M[1] | M[0] |
|---|---|---|---|---|
| Multiplier | R[3] | R[2] | R[1] | R[0] |
| Result | M[3]*R[3] (lower 8 bits) | M[2]*R[2] (lower 8 bits) | M[1]*R[1] (lower 8 bits) | M[0]*R[0] (lower 8 bits) |

Example 2: only include upper half of result in each result element, and discard lower half.

| Multiplicand | M[3] | M[2] | M[1] | M[0] |
|---|---|---|---|---|
| Multiplier | R[3] | R[2] | R[1] | R[0] |
| Result | M[3]*R[3] (upper 8 bits) | M[2]*R[2] (upper 8 bits) | M[1]*R[1] (upper 8 bits) | M[0]*R[0] (upper 8 bits) |

Example 3 specify upper and lower halves of result in different result registers:

| Multiplicand | M[3] | M[2] | M[1] | M[0] |
|---|---|---|---|---|
| Multiplier | R[3] | R[2] | R[1] | R[0] |

-continued

| | M[3]*R[3] | M[2]*R[2] | M[1]*R[1] | M[0]*R[0] |
|---|---|---|---|---|
| Result register 1 | (upper 8 bits) | (upper 8 bits) | (upper 8 bits) | (upper 8 bits) |
| Result register 2 | M[3]*R[3] (lower 8 bits) | M[2]*R[2] (lower 8 bits) | M[1]*R[1] (lower 8 bits) | M[0]*R[0] (lower 8 bits) |

Example 4: only consider half the input elements and spread result over adjacent lanes:

| Multiplicand | M[3] | M[2] | M[1] | M[0] |
|---|---|---|---|---|
| Multiplier | R[3] | R[2] | R[1] | R[0] |
| Result | | M[2]*R[2] (full 16 bits) | | M[0]*R[0] (full 16 bits) |

It will be appreciated that predication could be applied in some lanes of the SIMD operands, so that the multiplications in some lanes could be masked. The result values in mask lanes could be set to a fixed value such as 0, or could take the value which was previously stored in the register used to store the result value.

The examples above show possible operations for a selected element size of 8 bits, but the same configuration SIMD multiplier circuit 52 also supports operations at other element sizes, e.g. 16 bits:

Example 5

| Multiplicand | M[1] (16 bits) | M[0] (16 bits) |
|---|---|---|
| Multiplier | R[1] | R[0] |
| Result | M[1]*R[1] (lower or upper 16 bits) | M[0]*R[0] (lower or upper 16 bits) |

Similar examples to Examples 3 and 4 could also be provided for the 16-bit operation.

Some circuit implementations of the configurable SIMD multiplier 52 could process all of the elements in parallel. Other implementations may support an instruction set architecture which supports wider SIMD vector length, but implement the instructions on hardware supporting a smaller maximum vector length. In this case, the instruction may be mapped to several micro-operations which each process a subset of the input elements to generate a subset of the result elements.

The configurable SIMD multiplier performs a multiplication according to a radix-N modified Booth multiplication command, where $N=2^P$ and $P \geq 3$. In particular, for the examples below radix-8 modified Booth multiplication (also known as Booth-3 multiplication) is used. To support the modified Booth multiplication the configurable SIMD multiplier 52 includes a multiple generator 62 for generating a range of multiple values based on the multiplier operand R. When the multiplier operand R includes only a single data element, the multiple generator 62 generates each multiple as a respective multiple of the multiplier operand R as a whole (e.g. multiples extending from −4*R to +4*R for radix-8 modified Booth multiplication). If the selected element size is not the maximum element size supported, then multiples of each individual data element within the multiplier operand R are generated by the multiple generator 62 (e.g. with the 16-bit example shown above, multiples −4*R[1] to +4*R[1], and multiples −4*R[0] to +4*R[0]).

The configurable SIMD multiplier 52 also includes Booth digit selection circuitry 64 to select, based on respective bit portions of the multiplicand operand M, a number of Booth digits (BD) to be used for generating partial products. The Booth digit selection will be discussed in more detail below. The Booth digit selection may be independent of which size is indicated as the selected element size 58.

The multiplier 52 also includes partial product generation circuitry 66 which generates a number of partial products to be added by an adder 68 to generate the result value 60. For each element of the result, the partial product generation circuitry generates a set of partial products to be added to form that result element. For each partial product, one of the multiples of the corresponding multiplier element of operand R is selected, from among the multiples generated by the multiple generator 62. Which particular multiple of the relevant multiplier element R[i] is selected depends on the bit values of a corresponding Booth digit BD generated by the Booth digit selection circuitry 64 based on the multiplicand operand M.

The partial product generation circuitry 66 supplies the generated partial products to the adder 68, which adds the partial products to produce the result value 60. The adder 68 may comprise a summation network 67 (e.g. a 3:2 carry save adder tree) for summing the partial products, and a carry propagate adder 69 for adding the sum and carry terms produced by the summation network 67. Each of the multiple generator 62, the partial product generation circuitry 66 and the adder 68 perform a configurable operation, based on the selected element size 58 under control of the control circuitry 54.

Modified Booth multiplication is based on the principle that, within the multiplicand, a string of consecutive binary 1s can effectively be replaced with a +1 at the upper end of the string and a −1 at the lower end of the string, which can help to reduce many of the partial products to zero, which can make processor logic implementation more straightforward. This is analogous to 999 in decimal being equivalent to 1000−1. Hence, if considering a multiplication of 999*R, the "schoolbook" long multiplication approach would carry out a series of additions of partial products 900*R+90*R+9*R, with the Booth approach this could be reduced to 1000*R−1*R.

Figure 8:
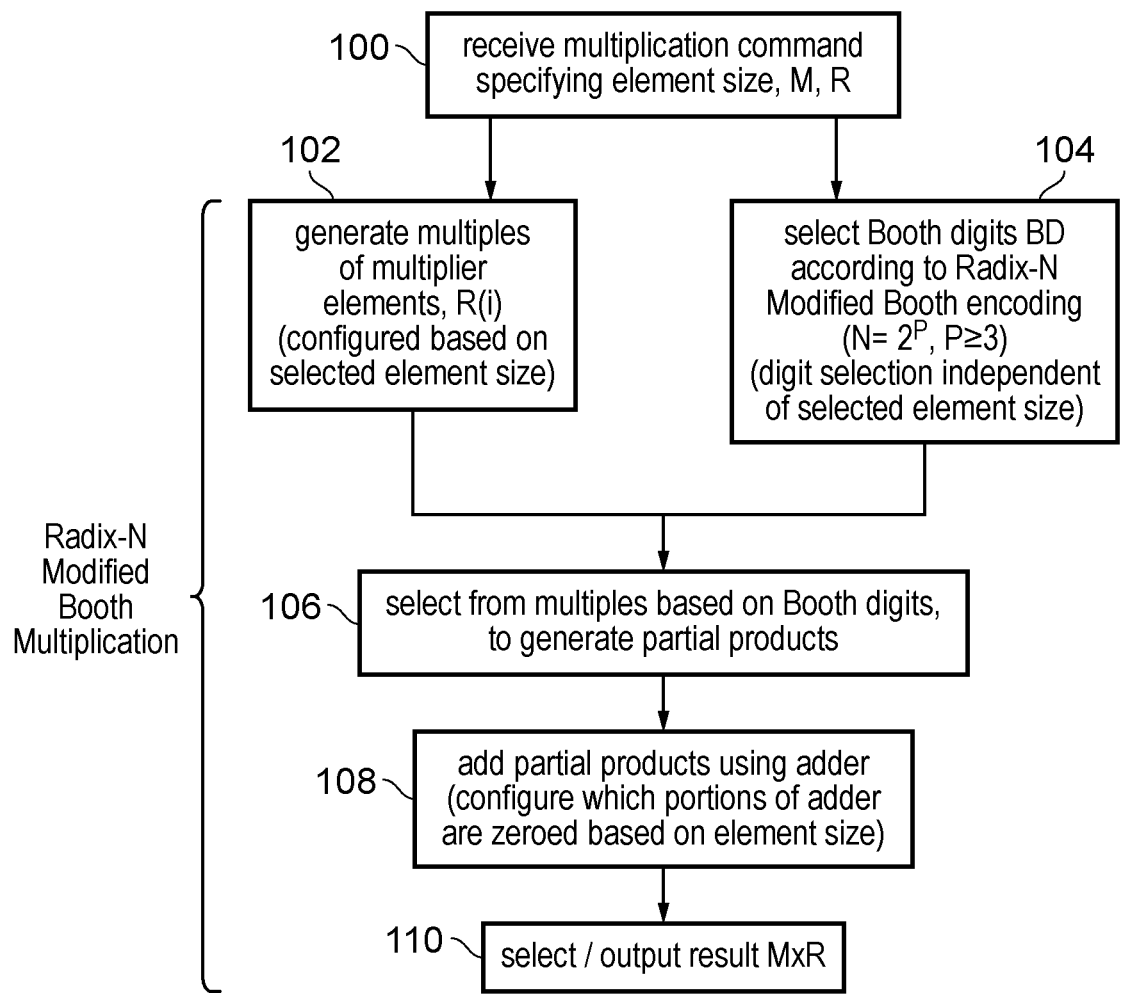
FIG. 8 is a flow diagram illustrating a method of performing a radix-N modified Booth multiplication.

Appendix A illustrates an example of radix-2 modified Booth multiplication. As shown in FIG. 8 referenced in the Appendix, Booth digits $BD_0$ to $BD_8$ from the multiplicand operand M based on overlapping pairs of bits, and for each Booth digit a multiple of the multiplier operand R (−R, 0 or +R) is selected based on the value of the Booth digit according to the multiple selection table shown. The selected multiples are used to form partial products $PP_0$ to $PP_8$ which are aligned according to the relative significance of the corresponding Booth digits $BD_0$ to $BD_8$ within the multiplicand operand M and added to generate the product result. Note that by using the Booth selection scheme many of the partial products fall away to zero and the remaining partial products can simply be generated based on a selected one of ±R multiples. In practice, radix-2 modified Booth multiplication is not typically used in circuit implementation as the number of partial products is no different to that which would be provided for a schoolbook long multiplication, but Appendix A is included to show the principle of Booth multiplication. Effectively in the example shown the string of three 1's included within the multiplicand operand M is replaced with 1000 minus 1, similar to the 999 example in decimal notation as described above.

Figure 9:
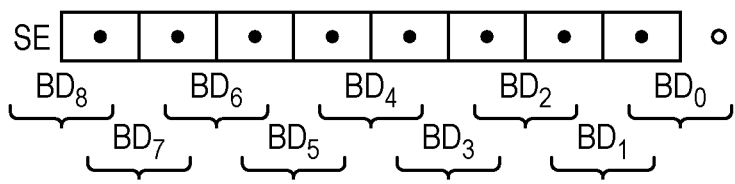
FIG. 9 illustrates digit selection for radix-2 modified Booth multiplication, as referenced in Appendix A.

As shown in Appendix B and FIG. 9, the total number of partial products required can be reduced by using radix-4 Booth multiplication (also known as Booth-2 multiplication). In this case, the Booth digits now comprise sets of 3 bits extracted from the multiplicand M at bit positions which overlap by 1 bit between adjacent Booth digits. As the Booth digits step through the multiplicand M more bits at a time, fewer Booth digits (and hence fewer partial products) are required. For each Booth digit, one of a range of multiples −2R to +2R is selected to use as the corresponding partial product (according to the multiple selection table shown in Appendix B), and again the aligned partial products are added. Appendix B shows the same multiplication example (M=56 and R=47) as in Appendix A, showing how the result is the same as with radix-2. Radix-4 Booth multiplication trades off a slight increase in the complexity of the logic for generating the partial products against a reduction of the number of partial products to be added so that the adder can be faster and/or be implemented with reduced circuit area. For example, if the summation network 67 is implemented as an adder tree, the reduction in the number of partial products provided by Booth encoding may enable a considerable saving in area. If the summation network 67 is implemented as a single adder then the reduction in the number of partial products may provide a significant decrease in overall delay.

Figure 10:
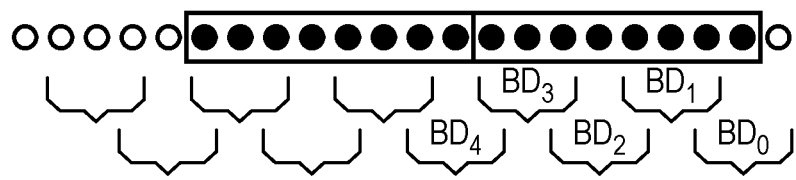
FIG. 10 illustrates digit selection for radix-4 modified Booth multiplication, as referenced in Appendix B.

As shown in Appendix C and FIG. 10, this principle can be extended further in radix-8 modified Booth multiplication (Booth 3 multiplication), where this time the Booth digits each comprise four bits of the multiplicand operand (overlapping by one bit each time), and so fewer Booth digits are needed in total. This time, the range of multiples of R which can be selected based on each Booth digit extend from −4R to +4R. The multiples ±4R, ±2R and ±R can be generated simply from the original value of R based on negation (two's complement) of R and/or left shifts of R by 1 or 2 bit positions. The generation of the ±3R term may be more complex and requires an addition of the ±2R and ±1 R multiples as will be discussed in more detail below.

Again, in Appendix C the same example multiplication 56×47 is shown and each partial product is selected as one of the multiples of R generated by the multiple generation circuitry 62 as selected based on the bit pattern of the corresponding Booth digits selected by the Booth digit selection circuitry 64. The adder 68 adds the partial products generated by the partial product generation circuitry 66, this time with a shift of 3 bits between respective partial products (to align the bits of corresponding significance within the result). The result value again matches the result produced in Appendices A and B. It can be seen that by using radix-8 modified Booth multiplication, the result can be generated with only three partial products as opposed to four partial products in the example of Appendix B.

Appendix D shows a corresponding example for radix-8 modified Booth multiplication when applied to a 16-bit×16-bit multiplication. As shown in FIG. 10, in a typical conventional digit selection scheme, the Booth digits for radix-8 modified Booth multiplication are selected so that each subsequent Booth digit after the lowest Booth digit is extracted from a bit position offset from the position of the previous Booth digit by 3 bits, until the most significant end of the multiplicand M is reached. The multiple selection based on the Booth digits follows the same approach as shown in the table of Appendix C. With a 16-bit×16-bit, 6 partial products are required.

Figure 3:
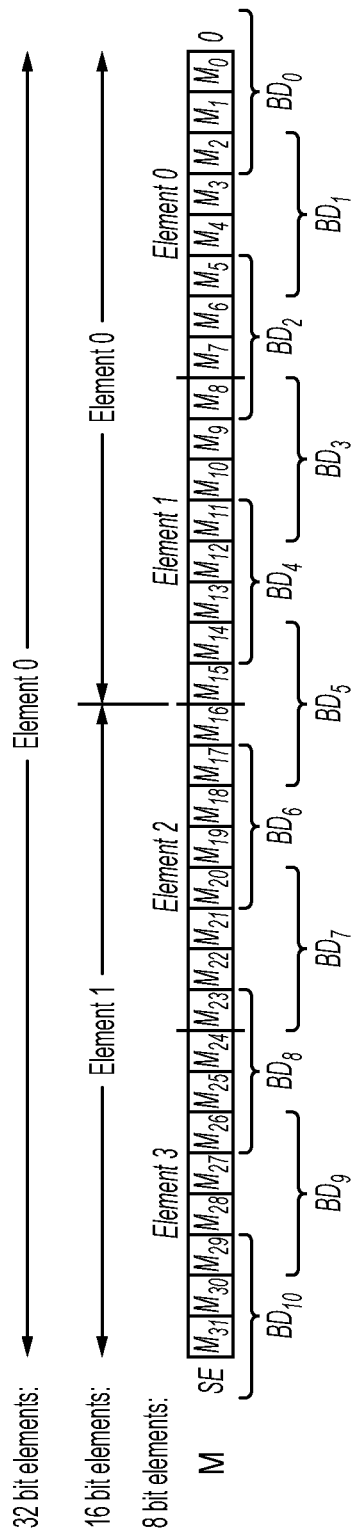
FIG. 3 schematically illustrates a comparative approach to Booth digit selection.

However, as shown in FIG. 3, the conventional Booth digit selection scheme for Radix-8 modified Booth multiplication does not fit well with configurable SIMD multiplier. FIG. 3 shows an example where the multiplicand M has 32 bits, which can be considered as a single 32-bit data element, a pair of two 16-bit data elements, or four independent 8-bit elements. With a conventional Booth digit selection scheme, when the element size is 32-bits then the Booth digits would be selected in the same way as shown in FIG. 10, where the upper three bits of Booth digit $BD_0$ are selected based on bits $M_2$ to $M_0$ of the multiplicand operand M (and the least significant bit of $BD_0$ is set to zero), and subsequent Booth digits $BD_1$ to $BD_{10}$ are each extracted from positions where the offset between adjacent Booth digits is 3 bits (e.g. the most significant bit of $BD_2$ is $M_8$ and the most significant bit of $BD_3$ is $M_{11}$).

However, a problem with this approach is that the phase relationship between the position of the Booth digits and the element boundaries varies from element to element when the selected element size is smaller than the maximum size. For example, when 16-bit elements are used then the Booth digit $BD_5$ covering the upper bits of element 0 only includes two of the bits ($M_{15}$–$M_{14}$) of element 0, while the most significant Booth digit $BD_{10}$ in element 1 would comprise 3 bits ($M_{31}$–$M_{29}$) of element 1. Similarly, when 8-bit element sizes are used then the most significant Booth digit $BD_2$ of element 0 would include three bits of element 0, the most significant Booth digit $BD_5$ in element 1 would include two bits of that element and the most significant Booth digit $BD_8$ in element 2 would include one bit of element 2.

Therefore, if the Booth digits are selected according to the scheme shown in FIG. 3, this results in a varying pattern from element to element which means that more complex logic would be needed to select the multiples of R generated by the multiple generator 62. Also, logic may be needed to apply different corrections to the selected Booth digits at the element boundaries, depending on both the selected element size 58 and on the specific position of the element within the overall vector (e.g. different adjustments may be needed for element 0 compared to elements 1 and 2 when an 8-bit element size is selected), to account for the different relative positions of the Booth digits compared to the elements. Hence, the approach shown in FIG. 3 can make the circuit implementation for a configurable SIMD multiplier much more complex. For example, to account for the different offsets of Booth digits relative to the element boundary, it may be necessary for the partial product generation circuitry 66 to include multiplexers with additional inputs so that there are multiple different versions of a given multiple of R (e.g. multiple different versions of the +R and the same for each other multiples), to account for the corrections at the element boundaries. A multiplexer can be more efficient to implement with a power-of-2 number of inputs than if the number of inputs is $2^n+1$, as the $(2^n+1)^{th}$ input may effectively require an additional stage of multiplexing and hence increase signal timing delay through the multiplexer. The 0 multiple of R may not need a specific multiplexer input, as it could be implemented in other ways (e.g. with a simple logic gate such as an AND gate), but the remaining multiples for radix-8 modified Booth multiplication already include 8 different values (+4, +3, +2, +1, −1, −2, −3, −4), and so if the multiplexer also had to consider different versions of each multiple, this could require at least one additional stage through the multiplexer, increasing the timing delay through the multiplexer, and requiring additional circuit area. Hence, this would impact on performance.

Figure 4:
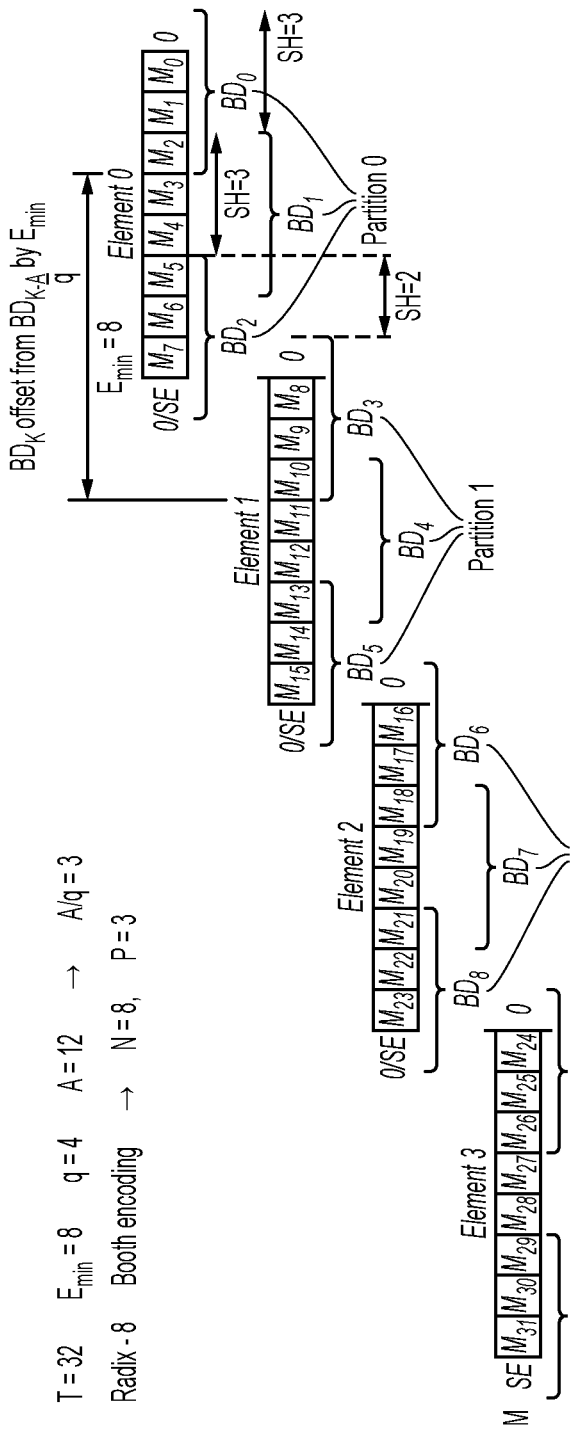
FIG. 4 shows a different scheme for selecting the Booth digits which better supports use in a configurable SIMD multiplier.

This problem can be addressed by changing the approach to Booth digit selection. FIG. 4 shows a modified approach for selecting the Booth digits to support a configurable SIMD multiplier. With this approach, even when the selected data element is larger than the minimum element size supported (e.g. $E_{min}=8$ in this example), the multiplicand operand M is effectively partitioned into a number of sub-portions each of size $E_{min}$ and each of these $E_{min}$-bit sub-portions is separately Booth encoded. For example, sub-portion (element) 0 comprising bits $M_7$–$M_0$ of the multiplicand operand is mapped to a partition of Booth digits comprising Booth digits $BD_0$, $BD_1$, $BD_2$. The next sub-portion 1 of the multiplicand operand M comprising bits $M_{15}$-$M_8$ is mapped to Booth digits $BD_3$ to $BD_5$ in another partition labelled partition 1 in FIG. 4. Similarly, the partitions 2 and 3 of Booth digits are generated from corresponding 8-bit portions of the multiplicand operand M. By effectively restarting the Booth encoding at each element boundary according to the minimum element size supported, even when performing a multiplication at a larger element size, this means that the positions of the Booth digits are consistent regardless of which particular element size has been selected by the command 56 triggering the multiplication.

As shown in FIG. 4, at the least significant Booth digit of each partition (Booth digits $BD_0$, $BD_3$, $BD_6$, $BD_9$), the least significant bit to encode is set to zero. At the most significant Booth digit of each partition (Booth digits $BD_2$, $BD_5$, $BD_8$, $BD_{11}$), the most significant bit to encode is set to either a sign extension of (i.e. to the same bit value as) the upper bit of the corresponding sub-portion of the multiplicand operand M, or a zero extension (i.e. the most significant bit is set to 0 regardless of the upper bit of the corresponding sub-portion of the multiplicand operand M). The zero extension is used for partitions which are not at the top of a data element, while sign extension is used for partitions which are at the top of a data element. For unsigned multiplications, each sign-extended bit has a value of 0. For signed multiplications, each sign-extended bit has a value of 0 or 1 to match the most significant bit of the value being sign-extended. For example, the sign/zero extension can be selected based on the data element size as follows:

8-bit elements: $BD_2$, $BD_5$, $BD_8$, $BD_{11}$ all sign extended;

16-bit elements: $BD_2$, $BD_8$ zero extended and $BD_5$, $BD_{11}$ sign extended;

32-bit elements: $BD_2$, $BD_5$, $BD_8$ zero extended and $BD_{11}$ sign extended.

The zeroing at the lower end of each partition is the same for each sub-portion, regardless of the selected element size and regardless of the relative position of that sub-portion within the overall multiplicand operand M. For the upper end of each partition, while whether a zero extension or sign extension is used depends on the selected element size (and whether the multiplication is an unsigned or signed operation), the bit position of the bits to be filled with the sign or zero extension is the same regardless of the selected element size (in contrast, with the approach shown in FIG. 3 where there would need to be additional circuitry to select, based on the element size, which bits of the Booth digit are filled with the sign or zero extension).

The approach shown in FIG. 4 is particularly useful for radix-8, radix-32 or higher radix or Booth multiplications where the offset between adjacent Booth digits in a conventional scheme 8s 3, 5, or higher and so does not fit well with data element sizes of a power-of-2 numbers of bits. Effectively, rather than having a consistent offset between adjacent Booth digits throughout the entire multiplicand operand, the offset between Booth digits varies, for example, the offset in bit positions between Booth digits $BD_0$ and $BD_1$ and $BD_1$ and $BD_2$ is equal to 3 bits, but the offset between Booth digits $BD_2$ and $BD_3$ is equal to 2 bits. This offset (referred to as SH in the discussion above) cycles in the pattern 3, 3, 2, 3, 3, 2, etc. in the particular example shown. More generally, the offset SH can be selected from one of two values P and $E_{min}$ modulo P, where $N=2^P$ and N is the radix used for the Booth multiplication. In the example of FIG. 4 P=3 and $E_{min}=8$, so $E_{min}$ modulo P=2. By extracting the Booth digits in this way, this means that the offset between Booth digit $BD_k$ and $BD_{k-A/q}$ is always equal to $E_{min}$ (8 in this example), where k is any value from 1 to A−1, A is the total number of Booth digits (A=12 in this example) and q is the number of partitions of size $E_{min}$ (q=4 in this example). This means the pattern of Booth digit extraction repeats in a consistent manner within each $E_{min}$-bit portion.

This approach is counter intuitive since at the larger element sizes, selecting the Booth digits in the way shown in FIG. 4 may increase the number of partial products that are required to be added by the adder 68. For example, note that for a 32-bit multiplication, the approach shown in FIG. 4 requires 12 partial products to be added (corresponding to Booth digits $BD_0$ to $BD_{11}$) whereas the approach shown in FIG. 3 would only have needed 11 partial products corresponding to Booth digits $BD_0$ to $BD_{10}$. The following table shows the number of partial products required for different operand widths:

| Element size | (A) no. of partial products (Radix-4) | (B) no. of partial products (Radix-8 with digit selection of FIG. 3) | (C) no. of partial products (Radix-8 with modified digit selection of FIG. 4) | (C) compared to (A) | (C) compared to (B) |
|---|---|---|---|---|---|
| 8 bits | 5 | 3 | 3 | −40% | 0% |
| 16 bits | 9 | 6 | 6 | −33% | 0% |
| 32 bits | 17 | 11 | 12 | −29% | +9% |
| 64 bits | 33 | 22 | 24 | −27% | +9% |

As shown in the table, while at element sizes of 32 or 64 bits, using the modified Booth encoding scheme (C) does increase the number of partial products required at 32-bit or 64-bit multiplications compared to scheme (B), this is still a significant decrease in the number of partial products required for Booth-2 multiplication, providing a 29% or 27% reduction in the number of partial products and hence an improvement in performance. Hence, even though the scheme shown in FIG. 4 requires slightly more partial products than the scheme shown in FIG. 3 for operand bit widths of 32 or 64, which may require additional logic in the summation network compared to FIG. 3, the benefit of the approach shown in FIG. 4 is that the processor logic 66 for generating the multiples and performing the Booth digit selection is much more efficient, as it needs less complexity in dealing with the positions of element boundaries, and so the overall balance between circuit area, timing requirements and performance may be better balanced with the approach shown in FIG. 4.

As shown in Appendix E when the modified Booth digit selection approach is used for carrying out the same 16b*16b multiplication 572*399 as shown in Appendix D, this gives the same result as Appendix D. Note that the relative offset between the positions at which the partial products are added varies from partial product to partial product (shifts of 2 or 3 between partial products), which matches the variable offsets SH between the positions at which the Boot digits were extracted from the multiplicand operand M.

The multiple generator 62 supports a configurable element size and so generates the various multiples of R based on each individual data element within the multiplier operand R. The +R multiples are simply equal to the input value of each element of the multiplier operand R. The −R multiple may be generated by generating the 2's complement of the input value of the multiplier R in each element of the multiplier operand. This may involve inverting all the bits of the multiplier operand and adding 1 at the least significant bit of each data element within the multiplier. The ±2R and ±4R multiples can be generated by a shifter which shifts the ±R multiples left by one or two bit positions. This can be done with a configurable shifter which can be selectively partitioned at the element boundaries so that the most significant bit on the right hand side of an element boundary does not get shifted into the least significant bit on the left hand side of the element boundary (which is part of a different data element). Any known configurable shifted design for SIMD shifts can be used for this.

Figure 5:
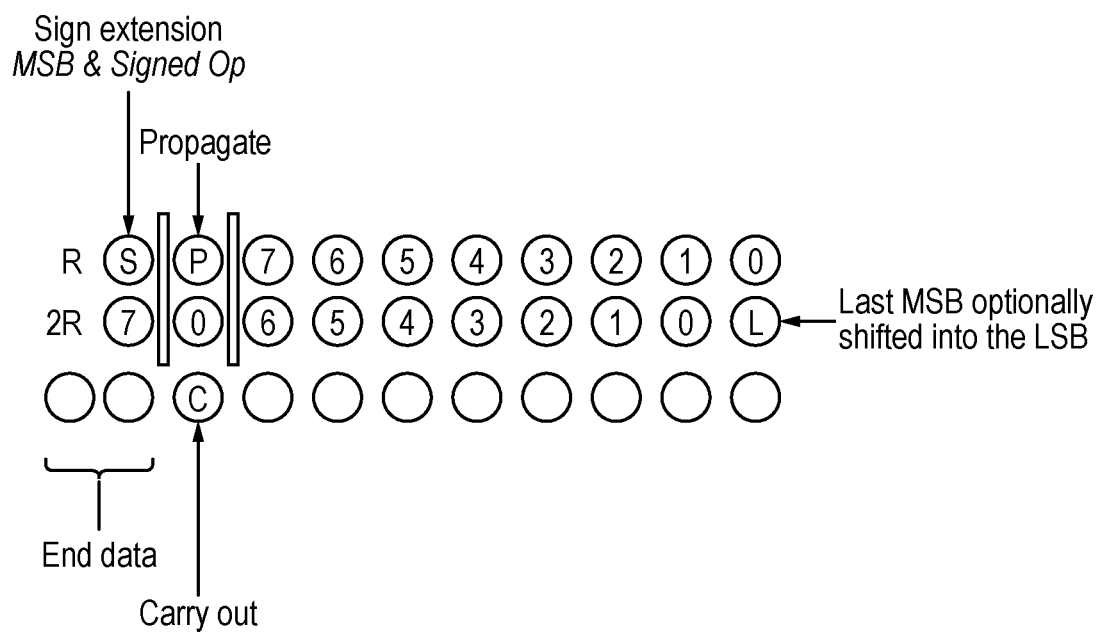
FIG. 5 illustrates generation of ±3R multiples for generating the partial products for a Booth multiplication.
Figure 6:
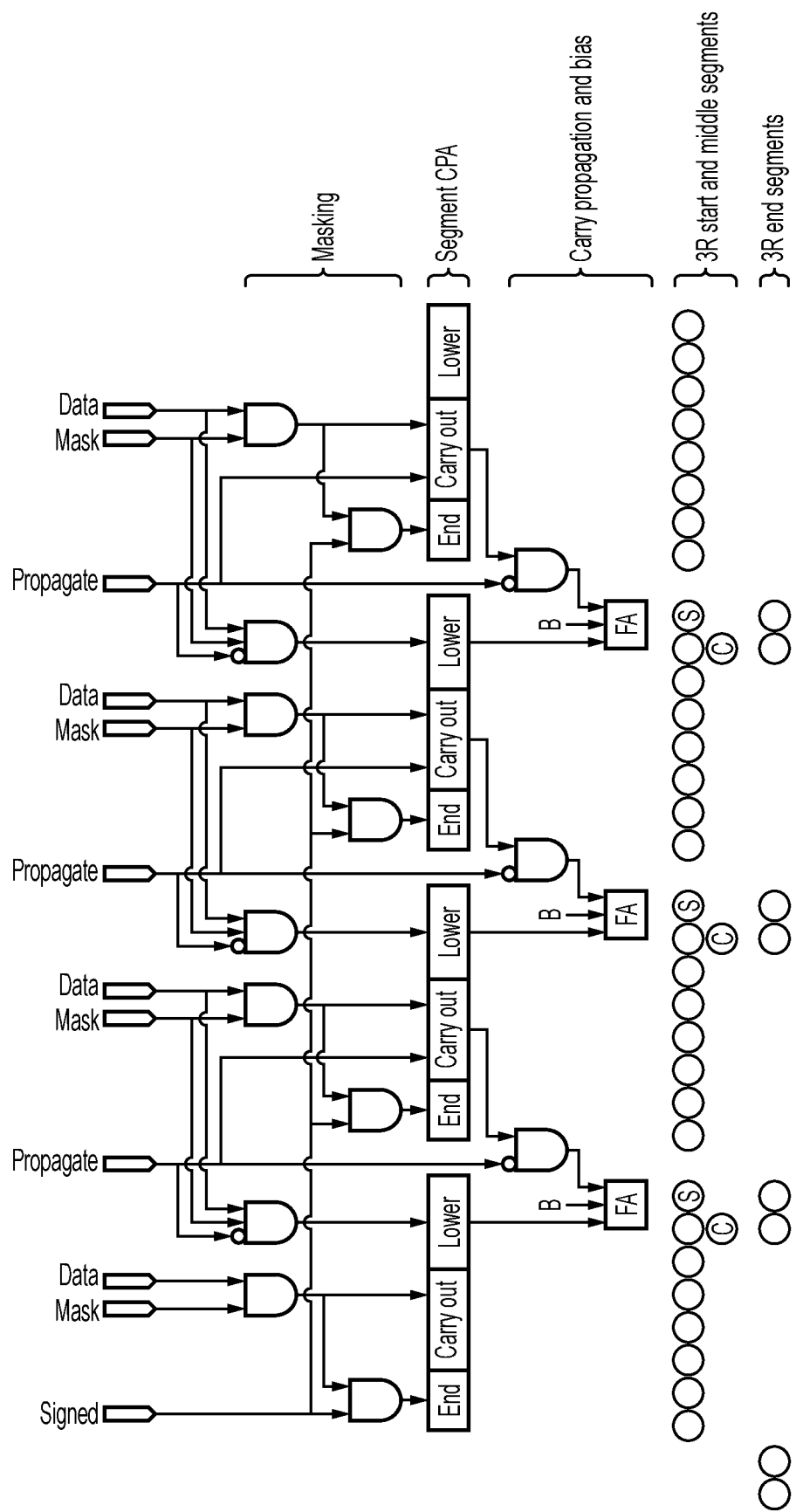
FIG. 6 illustrates how the addition for generating the ±3R term can be configurable based on the selected element size.

The generation of the plus or minus 3R multiples may be more complex and requires an addition of the ±2R and ±R values within each independent lane of the multiplier operand R. To avoid a full carry propagate adder (CPA) the addition is broken into small segments. Increasing the segment width is shown to reduce delay and area. A segment width equivalent to the minimal element width can be used. FIG. 5 shows the dot diagram for the generation of 3R using an 8-bit element CPA. For SIMD operations of variable precision a given CPA may be either the first, middle, or last for an element. The adder is used to generate the lower bits of 3R, with optionally the correct carry-out or sign extended segment end. FIG. 6 illustrates the generation of 3R for sum, carry, and end partial products. The propagate signals shown in FIG. 6 control whether bits from a lower 8-bit segment are passed to the next highest segment. The initial masking control can be pre-computed reducing the mask delay to a single AND02 gate. A full adder following the CPA factors the bias and the previous carry-out. The result is two sets of partial products—3R and 3R end—which are appropriately multiplexed. Supporting multiprecision adds little to the critical path as the masking controls are pre-calculated, the full adder is in the shadow of the CPA, and the Booth digit selection is done is parallel. The minus 3R multiple can be generated in a similar way or by 2's complementing the 3R multiple.

FIGS. 5 and 6 shows one example. Any other approach for calculating ±3R terms described in the literature for non-configurable Booth multipliers could also be used, but applied separately to each individual data element of the multiplier operand R in cases when the selected element size is smaller than the maximum element size supported.

Hence, the multiples +4R[i] to −4R[i] are generated for each respective multiplier element R[i] of the multiplier operand R. For each partial product that corresponds to a given result element of the result value, one of the multiples generated from the corresponding element of the multiplier operand R is selected by the partial product generation circuitry 66, based on a Booth digit extracts from a corresponding element of the multiplicand operand M. The partial products are then supplied to the adder 68.

Figure 7:
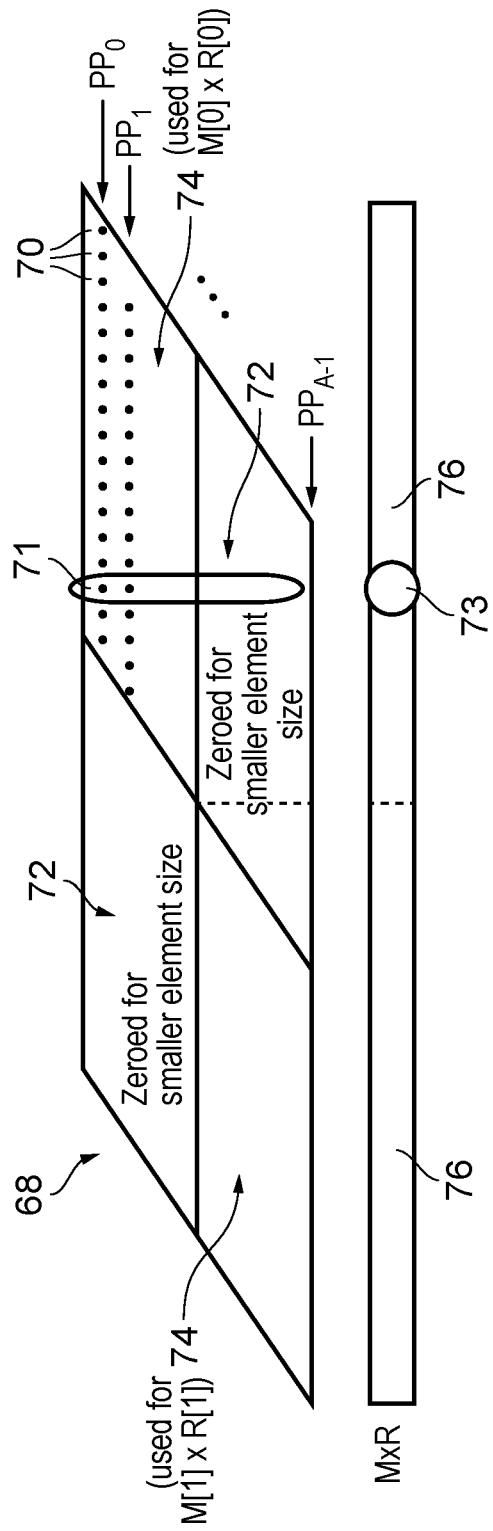
FIG. 7 shows an example of configuring an adder for adding partial products of a modified Booth multiplication so as to zero certain portions of the adder when a data element size less than the maximum element size is selected.

FIG. 7 shows an example of how an adder 68 for adding partial products, which supports a multiplication of a larger data element size, can be partitioned in a configurable manner to handle additions of partial products in independent lanes for a smaller data element size. Each "column" 71 of the adder adds bits from the respective partial products which are at corresponding bit significance within the result, when considering the relative offset in bit position of the respective partial products. The dots 70 shown in FIG. 7 each represent a given bit of a corresponding partial product, and the bits for which the dots appear in the same column 71 are added to produce a corresponding bit 73 of the result value M×R. Since radix-8 modified Booth multiplication is used in this example, the second partial product $PP_1$ is offset from the first partial product $PP_0$ by 3 bits. For conciseness not all of the bits are shown in FIG. 7. When the full operand size is being used, all of the input bits to the adder 68 are set to corresponding bits of the respective partial products, and the resulting additions produce a product value M×R which is of the full data size. For example if both of the multiplier R and the multiplicand operands M have the same data element size E then the result M×R may have 2E bits. In some examples, either the upper half or the lower half of the 2E-bit value could be discarded and only the remaining half written to a corresponding register as the result value as discussed above, or alternatively the entire result could be preserved by writing it to two different registers.

When the selected element size is smaller than the maximum size supported, then some of the input bits to the adder may be set to zero to indicate that these parts of the adder do not comprise any valid data. For example where the data element size is half the maximum size, then the portions of the adder marked 72 in FIG. 7 may be zeroed so that only the bits in the remaining portions 74 are set to values selected based on the relevant partial products derived from a corresponding lane of data elements within the multiplier R and multiplicand M. This means that the results value will include two independent product elements 76 each corresponding to the result of multiplying corresponding elements in the multiplier R and the multiplicand M.

It will be appreciated that this is just one possible design for the adder and other examples could also be used. For example, in some systems to reduce circuit complexity, instead of adding all of the partial products substantially in parallel as shown in the example of FIG. 7, an approach could be used where an accumulator register is used to add in a single partial product at a time to the previous contents of the accumulator register, and then the partial product addition is repeated a number of times for each successive partial product, with a shift of the accumulator register being performed between iterations to shift the value by a number of bits corresponding to the relevant offset between the Booth digits selected for those successive partial products. Hence, in general the addition of the partial products could be performed in a number of different ways.

FIG. 8 is a flow diagram showing a method of performing a multiplication operation in response to a multiplication command. At step 100 the multiplication circuit receives a multiplication command specifying a selected element size 58 and specifying the multiplicand and multiplier operands M, R. In response, at step 102 the multiple generator 62 generates various multiples of each data element included the multiplier R, under control of the control circuitry 54 which configures the multiple generator 62 based on the selected element size. Hence, for each individual data element R[i] of the multiplier R, a range of multiples extended from −4R to +4R are generated in the case of radix-8 modified Booth multiplication.

Meanwhile, at step 104 the Booth digit selection circuitry 64 extracts a number of Booth digits BD according to a radix-N modified Booth encoding scheme. The Booth digit selection is independent of which element size has been selected as the selected element size. The Booth digit selection uses the scheme shown in FIG. 4 where the pattern of Booth digits is consistent relative to the element boundary at the minimum element size, even when the current operation uses a selected element size larger than the minimum element size. This simplifies the multiple selection step at step 106, where based on each Booth digit one of the corresponding multiples of the relevant element R[i] of the multiplier R is selected to generate a corresponding partial product to be added. At step 108 the generated partial products are added using the adder (with the adder being configurable based on the element size to produce independent product results partitioned per element). As some of the input bits may be zero for some parts of the adder, it is possible to save power by power gating certain parts of the adder if not needed for processing the multiplication according the currently selected element size. At step 110 the output result is extracted from among the bits output by the adder 68 (some bits may be discarded for example if the full size multiplication result does not fit within the register provided for storing the result).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

Appendix A—Radix-2 Modified Booth Multiplication

M*R (M=multiplicand, R=multiplier)

FIG. 8 shows digit selection from M for generating partial products.

Multiple selection table:

| Selected Booth digit $M_i, M_{i-1}$ | Multiple of R selected as partial product |
| --- | --- |
| 00 | 0 |
| 01 | +1 |
| 10 | −1 |
| 11 | 0 |

Example M=56, R=47

M=00111000(0)
R=00101111
−R=11010001
$BD_0=M_0, M_{-1}=0(0) \rightarrow PP_0=0$
$BD_1=M_1, M_0=00 \rightarrow PP_1=0$
$BD_2=M_2, M_1=00 \rightarrow PP_2=0$
$BD_3=M_3, M_2=10 \rightarrow PP_3=-R=11010001$
$BD_4=M_4, M_3=11 \rightarrow PP_4=0$
$BD_5=M_5, M_4=11 \rightarrow PP_5=0$
$BD_6=M_6, M_5=01 \rightarrow PP_6=+R=00101111$
$BD_7=M_7, M_6=00 \rightarrow PP_7=0$
$BD_8=SE, M_7=00 \rightarrow PP_8=0$ Add partial products (shifted by 1 each time):

| | | |
| --- | --- | --- |
| $PP_0$ | 00000000 | |
| $PP_1$ | 00000000 | |
| $PP_2$ | 00000000 | |
| $PP_3$ | 111111010001 | ($PP_3$ sign extended) |
| $PP_4$ | 00000000 | |
| $PP_5$ | 00000000 | |
| $PP_6$ | 00101111 | |
| $PP_7$ | 00000000 + | |
| $PP_8$ | 00000000      + | |
| | 0000101001001000 | |
| | $= 2632_{10} = 56 * 47$ | |

9 partial products for 8*8 bit multiplication

Booth-2 not used in practice as would need same number of partial products as schoolbook "long multiplication" approach.

Appendix B—Radix-4 Modified Booth Multiplication (Booth2)

M*R (M=multiplicand, R=multiplier)

FIG. 9 shows digit selection from M for generating partial products.

Multiple selection table:

| Selected Booth digit $M_{i+1}, M_i, M_{i-1}$ | Multiple of R selected as Partial Product |
| --- | --- |
| 000 | 0 |
| 001 | +1 |
| 010 | +1 |
| 011 | +2 |
| 100 | −2 |
| 101 | −1 |
| 110 | −1 |
| 111 | 0 |

Example M=56, R=47

M=00111000
+2R=01011110
+R=00101111
−R=11010001
−2R=10100010
$BD_0=M_1,M_0,M_{-1}=00(0) \rightarrow PP_0=0$
$BD_1=M_3,M_2,M_1=100 \rightarrow PP_1=-2R=10100010$
$BD_2=M_5,M_4,M_3=111 \rightarrow PP_2=0$ $BD_3 = M_7, M_6, M_5 = 001 \rightarrow PP_3 = +R = 00101111$
$BD_4 = SE, SE, M_7 = 000 \rightarrow PP_4 = 0$
Add partial products (shifted by 2 each time):

```
PP0            00000000
PP1    11111110100010      (PP1 sign extended)
PP2            00000000
PP3            00101111
PP4    0000000000          +
       0000101001001000
       = 2632_10 = 56*47
```

5 partial products

Appendix C—Radix-8 Modified Booth Multiplication (Booth3)—8b*8b Multiplication M*R (M=multiplicand, R=multiplier)
FIG. 10 shows conventional digit selection from M for generating partial products:
Multiple selection table:

| Selected Booth digit $M_{i+2} : M_{i-1}$ | Multiple of R selected as Partial product |
|---|---|
| 0000 | 0 |
| 0001 | +1 |
| 0010 | +1 |
| 0011 | +2 |
| 0100 | +2 |
| 0101 | +3 |
| 0110 | +3 |
| 0111 | +4 |
| 1000 | −4 |
| 1001 | −3 |
| 1010 | −3 |
| 1011 | −2 |
| 1100 | −2 |
| 1101 | −1 |
| 1110 | −1 |
| 1111 | 0 |

Example M=56, R=47
  M=00111000
  +4R=10111100
  +3R=01110011
  +2R=01011110
  +R=00101111
  −R=11010001
  −2R=10100010
  −3R=(1) 01110011
  −4R=(1) 01000100
$BD_0 = M_2 : M = 000(0) \rightarrow PP_0 = 0$
$BD_1 = M_5 : M_2 = 1110 \rightarrow PP_1 = -R = 11010001$
$BD_2 = M_8 : M_5 = (0)001$ (bit 8 sign extended from bit 7) $\rightarrow PP_2 = +R = 00101111$ Add partial products (shift by 3 each time):

```
PP0            00000000
PP1    11111010001      (PP1 sign extended)
PP2            00101111     +
       001010010010000
       = 2632_10 = 56*47
```

3 partial products

Appendix D—Radix-8 Modified Booth Multiplication (Booth3)—16b*16b Multiplication, Conventional Digit Selection M*R (M=multiplicand, R=multiplier)
FIG. 10 shows digit selection from M for generating partial products.
Multiple selection table same as Appendix C.
Example M=572, R=399
  M=00000010 00111100
  +4R=00000110 00111100
  +3R=00000100 10101101
  +2R=00000011 00011110
  +R=00000001 10001111
  −R=11111110 01110001
  −2R=11111100 11100010
  −3R=11111011 01010011
  −4R=11111001 11000100
$BD_0 = M_2 : M_{-1} = 100(0) \rightarrow PP_0 = -4R = 11111001\ 11000100$
$BD_1 = M_5 : M_2 = 1111 \rightarrow PP_1 = 0$
$BD_2 = M_8 : M_5 = 0001 \rightarrow PP_2 = +R = 00000001\ 10001111$
$BD_3 = M_{11} : M_8 = 0010 \rightarrow PP_3 = +R = 00000001\ 10001111$
$BD_4 = M_{14} : M_{11} = 0000 \rightarrow PP_4 = 0$
$BD_5 = M_{17} : M_{14} = (00)00 \rightarrow PP_5 = 0$
Add partial products (shift by 3 each time):

```
PP0    1111111111111111111100111000100
PP1            0000000000000000
PP2            0000000110001111
PP3            0000000110001111
PP4            000000000000000
PP5    0000000000000000                +
       00000000000001100001000010000100

= 228228_10 = 572*399
```

6 partial products.

Figure 11:
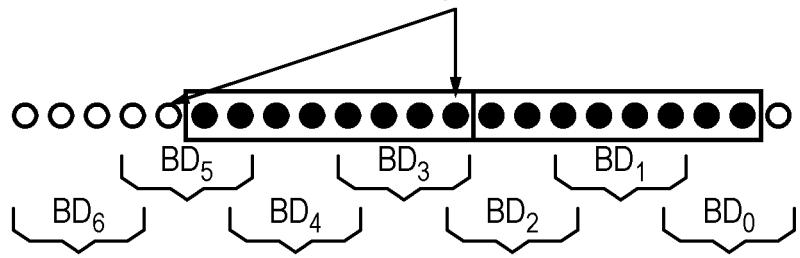
FIG. 11 illustrates a comparative approach for digit selection for radix-8 modified Booth multiplication, as referenced in Appendices C and D.
Figure 12:
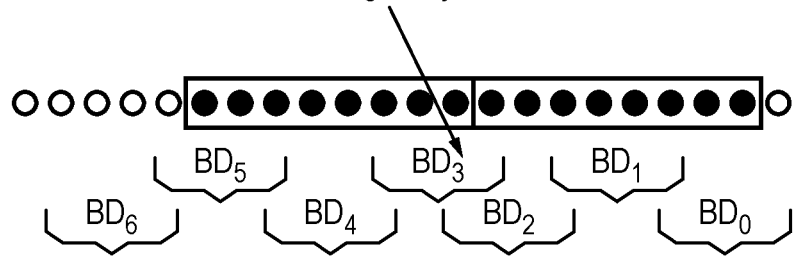
FIG. 12 illustrates the modified approach for digit selection for radix-8 modified Booth multiplication, as referenced in Appendix E.

Appendix E—Radix-8 Modified Booth Multiplication (Booth3)—16b*16b Multiplication, Modified Digit Selection M*R (M=multiplicand, R=multiplier)
FIG. 11 shows modified digit selection from M for generating partial products.
Multiple selection table same as Appendix C.
Example M=572, R=399
  M=00000010 00111100
  +4R=00000110 00111100
  +3R=00000100 10101101
  +2R=00000011 00011110
  +R=00000001 10001111

−R=11111110 01110001
−2R=11111100 11100010
−3R=11111011 01010011
−4R=11111001 11000100
$BD_0=M_2:M_{-1}=100(0) \rightarrow PP_0=-4R=11111001\ 11000100$
$BD_1=M_5:M_2=1111 \rightarrow PP_1=0$
$BD_2=S:M_7:M_5=(0)001$ (zero extend for bit 8)$\rightarrow PP_2=+R=00000001\ 10001111$
$BD_3=M_{10}:M_8:0=010(0)$ (0 at least significant bit)$\rightarrow PP_3=+2R=00000011\ 00011110$
$BD_4=M_{13}:M_{10}=0000 \rightarrow PP_4=0$
$BD_5=M_{16}:M_{13}=(0)000$ (sign extend for bit 16)$\rightarrow PP_5=0$
Add partial products (shift by 3 or 2 each time):

| | |
|---|---|
| $PP_0$ | 11111111111111111111100111000100 |
| $PP_1$ | 0000000000000000 |
| $PP_2$ | 0000000110001111 |
| $PP_3$ | 0000001100011110   (shift by 2 relative to $PP_2$) |
| $PP_4$ | 000000000000000 |
| $PP_5$ | 0000000000000000   + |
| | 00000000000011000010000100 |
| | $= 228228_{10} = 572*399$ |

6 partial products. Same result as in Appendix D. Modified digit selection means position of Booth digits is independent of data element size and less multiplexing circuitry needed to select the multiple of R based on the Booth digit.

The invention claimed is:

1. An apparatus comprising:
   a configurable SIMD multiplication circuit to perform multiplication on a multiplicand operand M and a multiplier operand R to generate a result value; and
   control circuitry responsive to a multiplication command specifying a selected element size from a plurality of element sizes supported by the configurable SIMD multiplication circuit, to control the configurable SIMD multiplication circuit to generate the result value in which each of one or more result elements within the result value has a value corresponding to the product of a corresponding multiplicand element of the multiplicand operand M and a corresponding multiplier element of the multiplier operand R, said corresponding multiplicand element having the selected element size; wherein:
   for each of said plurality of element sizes supported by the configurable SIMD multiplication circuit, the configurable SIMD multiplication circuit is configured to generate each result element of the result value using radix-N modified Booth multiplication of the corresponding multiplicand element and the corresponding multiplier element, where $N=2^P$ and $P \geq 3$; and
   the configurable SIMD multiplication circuit comprises:
      Booth digit selection circuitry to select a given number A of Booth digits $BD_0$ to $BD_{A-1}$, each Booth digit based on a respective bit portion of the multiplicand operand M;
      partial product generation circuitry to generate a plurality of partial products for each result element of the result value, each partial product comprising a multiple of the corresponding multiplier element selected based on a respective one of the Booth digits for which the bit portion used to select the Booth digit is within the corresponding multiplicand element; and
      an adder to generate each result element of the result value by adding the plurality of partial products generated for that result element by the partial product generation circuitry.

2. The apparatus according to claim 1, in which a minimum element size supported by the configurable SIMD multiplication circuit is $E_{min}$ bits, and $E_{min}$ modulo P is non-zero.

3. The apparatus according to claim 1, in which a minimum element size supported by the configurable SIMD multiplication circuit is $E_{min}$ bits; and
   in response to a multiplication command for which the selected element size is greater than $E_{min}$ bits, the configurable SIMD multiplication circuit is configured to perform said radix-N modified Booth multiplication with a Booth encoding applied separately to each $E_{min}$-bit portion of the multiplicand operand M.

4. The apparatus according to claim 1, in which the bit portions of the multiplicand operand M used by the Booth digit selection circuitry to select the Booth digits are at the same bit positions within the multiplicand operand M regardless of which of the plurality of element sizes is the selected element size.

5. The apparatus according to claim 1, in which a mapping between bit values of said respective one of the Booth digits and which multiple of the corresponding multiplier element is selected by the partial product generation circuitry is independent of which of said plurality of element sizes is the selected element size.

6. The apparatus according to claim 1, in which a mapping between bit values of said respective one of the Booth digits and which multiple of the corresponding multiplier element is selected by the partial product generation circuitry is independent of a relative position between the bit portion of the multiplicand operand M used to select the Booth digit and an element boundary between respective elements of the selected element size within the multiplicand operand M.

7. The apparatus according to claim 1, in which the Booth digit selection circuitry is configured to select the Booth digits $BD_0$ to $BD_{A-1}$, where:
   Booth digit $BD_0$ is selected based on a least significant bit portion of the multiplicand operand M,
   Booth digit $BD_{A-1}$ is selected based on a most significant bit portion of the multiplicand operand M,
   Booth digit $BD_i$, where $1 \leq i \leq A-1$, is selected based on a bit portion of the multiplicand operand M having a most significant bit SH bit positions more significant than a most significant bit of the bit portion used to select Booth digit $BD_{i-1}$, and
   SH has a different value for at least two values of i less than A−1.

8. The apparatus according to claim 7, in which the Booth digit selection circuitry is configured to select the Booth digits with SH<P for at least one value of i less than A−1.

9. The apparatus according to claim 7, in which the Booth digit selection circuitry is configured to select the Booth digits with SH having one of two values P and $E_{min}$ modulo P for each value of i less than A−1.

10. The apparatus according to claim 7, in which the multiplicand operand M comprises T bits, where $T=q*E_{min}$ and $E_{min}$ is a minimum element size supported by the configurable SIMD multiplication circuit; and
   the Booth digit selection circuitry is configured to select Booth digit $BD_k$, where $(A/q) \leq k \leq A-1$, based on a bit portion of the multiplicand operand M having a most significant bit $E_{min}$ bit positions more significant than a most significant bit of the bit portion used to select Booth digit $BD_{k-A/q}$.

11. The apparatus according to claim 1, in which the multiplicand operand M comprises T bits, where $T=q*E_{min}$ and $E_{min}$ is a minimum element size supported by the configurable SIMD multiplication circuit; and said given number A of Booth digits comprise q partitions of Booth digits, each partition of Booth digits selected based on bit portions in a corresponding sub-portion of size $E_{min}$ within the multiplicand operand M.

12. The apparatus according to claim 11, in which said given number A of Booth digits satisfies $$A \geq q * \left( \left\lfloor \frac{E_{\min}}{P} \right\rfloor + 1 \right).$$

13. The apparatus according to claim 11, in which for a least significant Booth digit of each partition, the Booth digit selection circuitry is configured to set a least significant bit of the least significant Booth digit to 0 regardless of which of said plurality of element sizes is the selected element size, and to set remaining bits of the least significant Booth digit based on a least significant bit portion of the corresponding sub-portion of the multiplicand operand M.

14. The apparatus according to claim 11, in which for a most significant Booth digit of each partition, the Booth digit selection circuitry is configured to generate the most significant Booth digit based on a sign extension or zero extension of a most significant bit portion of the corresponding sub-portion of the multiplicand operand M, and a bit position of sign-extended or zero-extended bits within the most significant Booth digit is the same regardless of which of said plurality of elements is the selected element size.

15. The apparatus according to claim 1, in which N=8.

16. An apparatus comprising:
means for performing a configurable SIMD multiplication on a multiplicand operand M and a multiplier operand R to generate a result value; and
means for controlling, in response to a multiplication command specifying a selected element size from a plurality of element sizes supported by the configurable SIMD multiplication circuit, the means for performing the configurable SIMD multiplication to generate the result value in which each of one or more result elements within the result value has a value corresponding to the product of a corresponding multiplicand element of the multiplicand operand M and a corresponding multiplier element of the multiplier operand R, said corresponding multiplicand element having the selected element size; wherein:
for each of said plurality of element sizes, the means for performing the configurable SIMD is configured to generate each result element of the result value using radix-N modified Booth multiplication of the corresponding multiplicand element and the corresponding multiplier element, where $N=2^P$ and $P \geq 3$; and
the means for performing the configurable SIMD multiplication comprises:
means for selecting a given number A of Booth digits $BD_0$ to $BD_{A-1}$, each Booth digit based on a respective bit portion of the multiplicand operand M;
means for generating a plurality of partial products for each result element of the result value, each partial product comprising a multiple of the corresponding multiplier element selected based on a respective one of the Booth digits for which the bit portion used to select the Booth digit is within the corresponding multiplicand element; and
means for adding to generate each result element of the result value by adding the plurality of partial products generated for that result element by the means for generating.

17. A data processing method comprising:
receiving a multiplication command specifying a selected element size from a plurality of element sizes supported by a configurable SIMD multiplication circuit;
in response to the multiplication command, controlling the configurable SIMD multiplication circuit to perform multiplication on a multiplicand operand M and a multiplier operand R to generate a result value in which each of one or more result elements within the result value has a value corresponding to the product of a corresponding multiplicand element of the multiplicand operand M and a corresponding multiplier element of the multiplier operand R, said corresponding multiplicand element having the selected element size; wherein:
for each of said plurality of element sizes, the configurable SIMD multiplication circuit generates each result element of the result value using radix-N modified Booth multiplication of the corresponding multiplicand element and the corresponding multiplier element, where $N=2^P$ and $P \geq 3$; and
the configurable SIMD multiplication circuit comprises:
Booth digit selection circuitry to select a given number A of Booth digits $BD_0$ to $BD_{A-1}$, each Booth digit based on a respective bit portion of the multiplicand operand M;
partial product generation circuitry to generate a plurality of partial products for each result element of the result value, each partial product comprising a multiple of the corresponding multiplier element selected based on a respective one of the Booth digits for which the bit portion used to select the Booth digit is within the corresponding multiplicand element; and
an adder to generate each result element of the result value by adding the plurality of partial products generated for that result element by the partial product generation circuitry.

* * * * *